(12) United States Patent
Jeong et al.

(10) Patent No.: US 10,867,069 B2
(45) Date of Patent: Dec. 15, 2020

(54) TRUSTZONE GRAPHIC RENDERING METHOD AND DISPLAY DEVICE USING THE SAME

(71) Applicant: SAMSUNG ELECTRONICS CO., LTD., Suwon-si (KR)

(72) Inventors: Donghwa Jeong, Suwon-si (KR); Sunggyu Lee, Suwon-si (KR); Euijin Je, Suwon-si (KR); Hyuncheol Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/285,511

(22) Filed: Feb. 26, 2019

(65) Prior Publication Data
US 2019/0266345 A1  Aug. 29, 2019

(30) Foreign Application Priority Data
Feb. 27, 2018  (KR) .......................... 10-2018-0023897

(51) Int. Cl.
*G09G 5/00* (2006.01)
*G06F 21/62* (2013.01)
*G09G 5/36* (2006.01)
*G06F 9/451* (2018.01)
*G06F 21/57* (2013.01)

(52) U.S. Cl.
CPC .......... *G06F 21/6245* (2013.01); *G06F 9/451* (2018.02); *G06F 21/57* (2013.01); *G06F 21/62* (2013.01); *G09G 5/363* (2013.01); *G09G 2358/00* (2013.01); *G09G 2360/18* (2013.01)

(58) Field of Classification Search
CPC .......... G06F 21/74; G06F 21/57; G06F 21/62; G06F 21/31; G06F 21/53; G06F 2221/031; G06F 12/1491; G06F 21/121; G06F 21/50; G06F 21/575; G06F 21/604;
(Continued)

(56) References Cited

U.S. PATENT DOCUMENTS 9,489,505 B2  11/2016 Heider
2012/0005592 A1*  1/2012 Joshi ...................... G06F 3/038
715/746
(Continued)

FOREIGN PATENT DOCUMENTS

KR  10-2014-0061313  5/2014
KR  10-2016-0008012  1/2016
KR  10-2017-0012957  2/2017

OTHER PUBLICATIONS

Search Report and Written Opinion dated Jun. 11, 2019 in counterpart International Patent Application No. PCT/KR2019/002299.

*Primary Examiner* — Hau H Nguyen
(74) *Attorney, Agent, or Firm* — Nixon & Vanderhye P.C.

(57) ABSTRACT

A trustzone graphic rendering method in an operating system (OS) divided into a normal world (NWD) and a secure world (SWD) corresponding to a trustzone. The trustzone graphic rendering method includes generating an image resource used to generate a trustzone user interface (UI) in the NWD, transmitting the image resource from the NWD to the SWD, and generating the trustzone UI in the SWD, by separating and editing the image resource including a plurality of objects, wherein the separating and editing is performed in units of objects.

20 Claims, 10 Drawing Sheets

(58) Field of Classification Search
CPC .... G06F 21/6245; G06F 21/83; G06F 3/0489; G06Q 20/35765; G09G 2358/00
See application file for complete search history.

(56) References Cited

U.S. PATENT DOCUMENTS

| | | |
|---|---|---|
| 2013/0145475 A1 | 6/2013 | Ryu et al. |
| 2015/0199507 A1 | 7/2015 | Azab et al. |
| 2016/0328602 A1 | 11/2016 | Zuo et al. |
| 2018/0145948 A1 | 5/2018 | Kim et al. |
| 2018/0374392 A1* | 12/2018 | Ollivier ................ G07F 7/0886 |

* cited by examiner

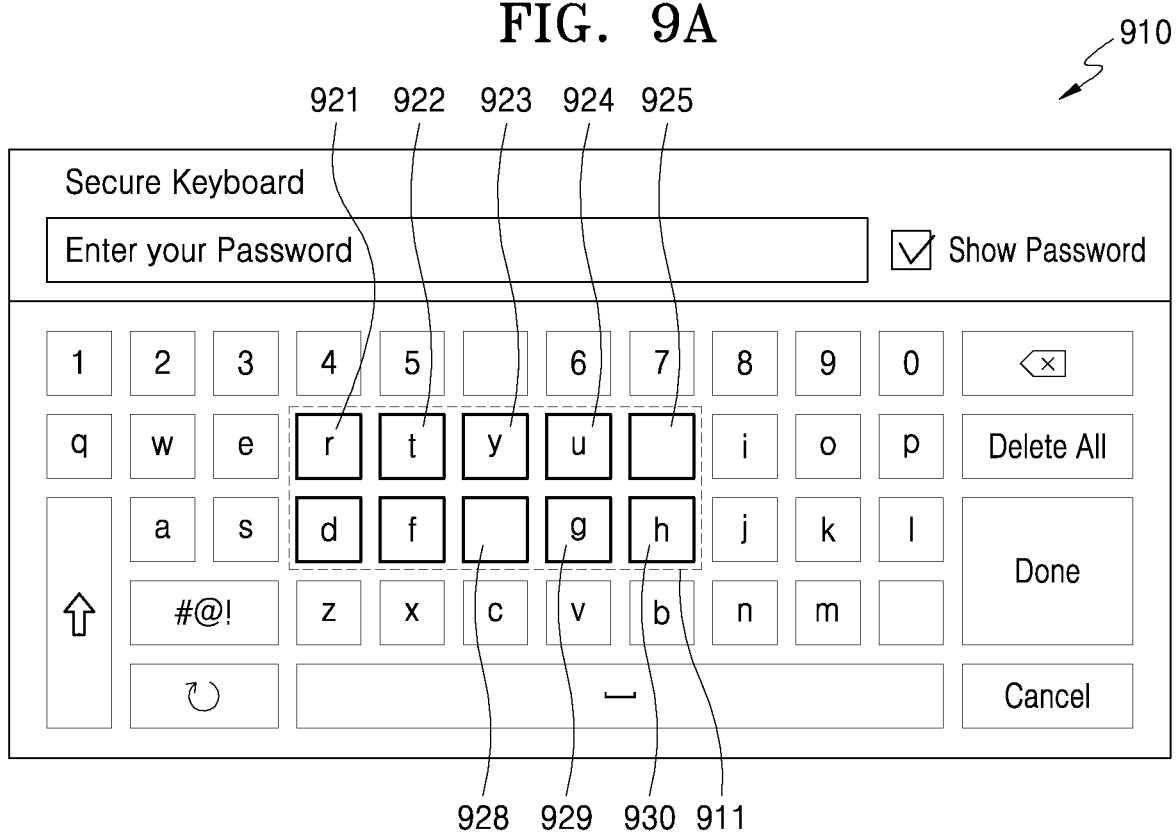
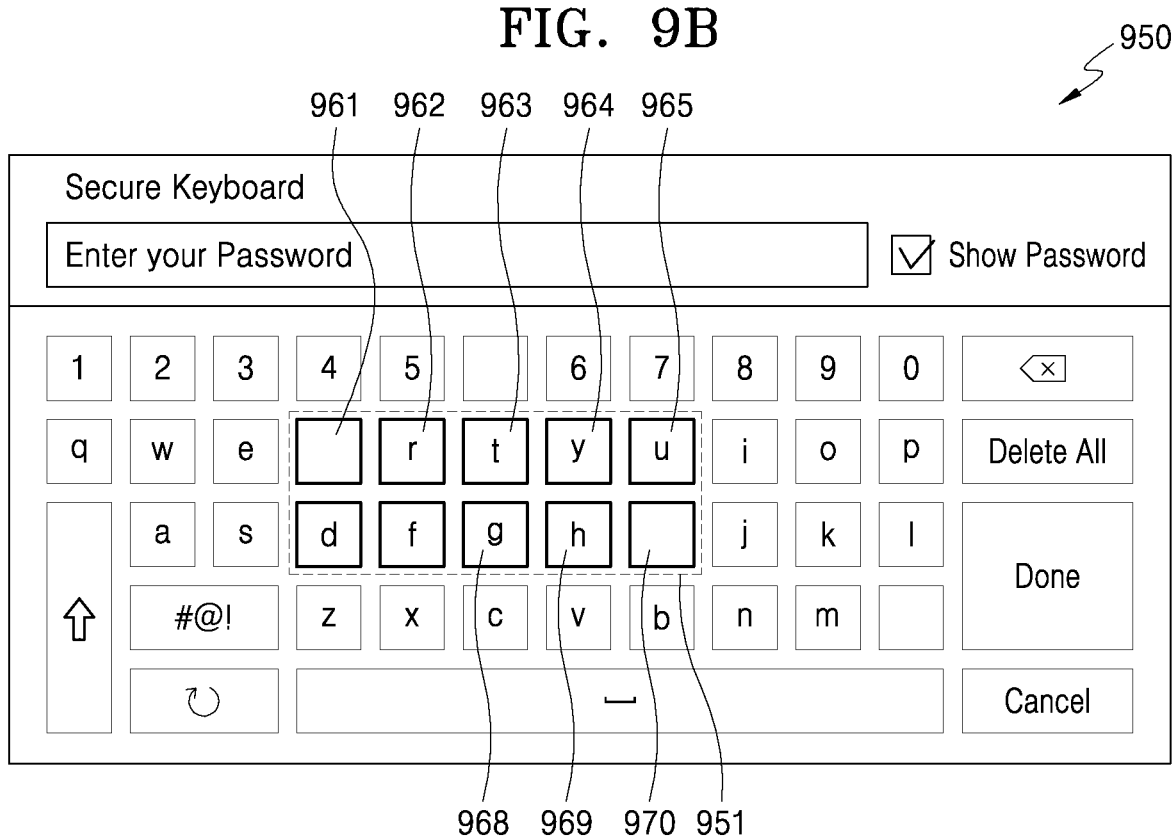

TRUSTZONE GRAPHIC RENDERING METHOD AND DISPLAY DEVICE USING THE SAME

CROSS-REFERENCE TO RELATED APPLICATION

This application is based on and claims priority under 35 U.S.C. § 119 to Korean Patent Application No. 10-2018-0023897, filed on Feb. 27, 2018, in the Korean Intellectual Property Office, the disclosure of which is incorporated by reference herein in its entirety.

BACKGROUND

1. Field

The disclosure relates to a trustzone graphic rendering method and a display device using the same.

For example, the disclosure relates to a graphic rendering method and a display device using the same to generate a trustzone user interface (UI) screen in a secure world corresponding to a trustzone.

2. Description of Related Art

Electronic devices such as computers, smartphones, tablet personal computers (PCs), personal digital assistants (PDAs), etc., have been used closely with users. As electronic devices for personal use have become more widespread, user's personal information or user-related information input to or stored in electronic devices has also been increasing.

Users carry out various tasks using electronic devices or server devices, and a user's personal information or user-related information is increasingly input to electronic devices or server devices.

Hereinbelow, an electronic device or a server device that performs a particular task or operation may be referred to as a 'computing device'. When a user's personal information or user-related information is input to or stored in a computing device, the user's personal information or the user-related information must be protected from hacking.

To this end, security techniques for protecting the user's personal information or the user-related information from hacking have been developed.

One of the security techniques may be, for example, a security method using a trustzone.

The trustzone is one of the hardware security techniques, in which hardware such as a memory, etc., is divided into a normal world (NWD) and a secure world (SWD) corresponding to the trustzone and an access from the NWD to a resource of the SWD is made impossible in order to protect data input through the SWD and stored in the SWD.

A memory capacity of the SWD is much smaller than that of the NWD. Thus, the SWD has a limitation in the amount of resources that may be stored therein when compared to the NWD, and also in the volume and speed of tasks that may be processed. Moreover, when a particular operation is performed in the SWD, due to shortage of a program, a tool, and/or a resource that is useful for performing the operation in the SWD, a processing speed is lower than that of an operation in the NWD.

Therefore, there is a need for a method and device for easily and rapidly performing an operation that needs to maintain security, e.g., a graphic rendering operation in a trustzone, etc., in an operating system (OS) divided into an SWD and an NWD, by overcoming the foregoing problem.

SUMMARY

Example embodiments of the disclosure provide a trustzone graphic rendering method and a display device using the same to easily and rapidly generate a trustzone user interface (UI) while improving security performance.

For example a trustzone graphic rendering method and a display device using the same to address a memory capacity limitation of a secure world corresponding to a trustzone and reduce a time delay in generating or changing the trustzone UI are provided.

Additional aspects will be set forth in part in the description which follows and, in part, will be apparent from the description.

According to an embodiment of the disclosure, a trustzone graphic rendering method may be a trustzone graphic rendering method in an operating system (OS) divided into a normal world (NWD) and a secure world (SWD) corresponding to a trustzone.

The trustzone graphic rendering method includes generating an image resource used to generate a trustzone user interface (UI) in the NWD, transmitting the image resource from the NWD to the SWD, and, generating the trustzone UI by separating and editing the image resource including a plurality of objects in the SWD, wherein the separating and editing is performed in units of objects.

The generating of the image resource may include generating the image resource, in the NWD, using at least one graphic toolkit present in the NWD.

The trustzone UI may include at least one of a UI screen, image data corresponding to the UI screen, and/or an image resource used for generating the UI screen, in which data may be input and/or output through the UI screen based on interaction with the user.

The trustzone UI may include at least one of a secure keypad and/or a secure keyboard.

The image resource may include image data corresponding to at least a portion of an image output through a screen.

The trustzone graphic rendering method may further include storing the image resource in a memory of the SWD that is not accessible by the NWD and that is not accessible from outside the OS, upon receiving the image resource in the SWD.

The generating of the trustzone UI may include loading the image resource stored in the memory of the SWD and generating the trustzone UI, by separating at least one object to be edited among the plurality of objects included in the loaded image resource and editing the at least one separated object.

The generating of the trustzone UI may include generating the trustzone UI by performing at least one operation among deleting at least one separated object, changing the at least one separated object, and/or adding at least one object to the at least one separated object.

The generating of the image resource may include generating the image resource corresponding to a language using a font engine executed in the NWD.

The trustzone graphic rendering method may further include storing the trustzone UI in a frame buffer included in the SWD and displaying the trustzone UI loaded from the frame buffer on the display.

The trustzone UI may be accessed and stored in the SWD.

According to another example embodiment of the disclosure, a display device includes a display, a memory configured to store one or more instructions, and a controller including at least one processor configured to execute the one or more instructions to execute an OS divided into an NWD and an SWD corresponding to a trustzone. The at least one processor may be further configured to generate an image resource used to generate a trustzone user interface (UI) in the NWD, transmit the image resource from the NWD to the SWD, and, generate the trustzone UI by separating and editing the image resource including a plurality of objects in the SWD, wherein the separating and editing is performed in units of objects.

The at least one processor may be further configured to generate the image resource, in the NWD, using at least one graphic toolkit present in the NWD.

The trustzone UI may include at least one of a UI screen, image data corresponding to the UI screen, and/or an image resource used for generating the UI screen, in which data may be input and/or output through the UI screen based on interaction with the user.

The at least one processor may be further configured to store the image resource in a memory of the SWD that is not accessible by the NWD and that is not accessible from outside the OS, upon receiving the image resource in the SWD.

The at least one processor may be further configured to load the image resource stored in the memory of the SWD and generate the trustzone UI, by separating at least one object to be edited among the plurality of objects included in the loaded image resource and editing the at least one separated object.

The at least one processor may be further configured to generate the trustzone UI, by deleting or changing the at least one separated object and/or adding at least one object to the at least one separated object.

The at least one processor may be further configured to store the trustzone UI in a frame buffer included in the SWD and display the trustzone UI loaded from the frame buffer on the display.

The at least one processor may be further configured to generate the image resource corresponding to a language using a font engine executed in the NWD.

The trustzone UI may include at least one of a secure keypad and/or a secure keyboard.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 9A is a diagram illustrating an example editing operation of a secure keyboard before editing the secure keyboard according to an example embodiment of the disclosure;

FIG. 9B is a diagram illustrating an example editing operation of a secure keyboard after editing the secure keyboard according to an example embodiment of the disclosure.

DETAILED DESCRIPTION

Figure 1:
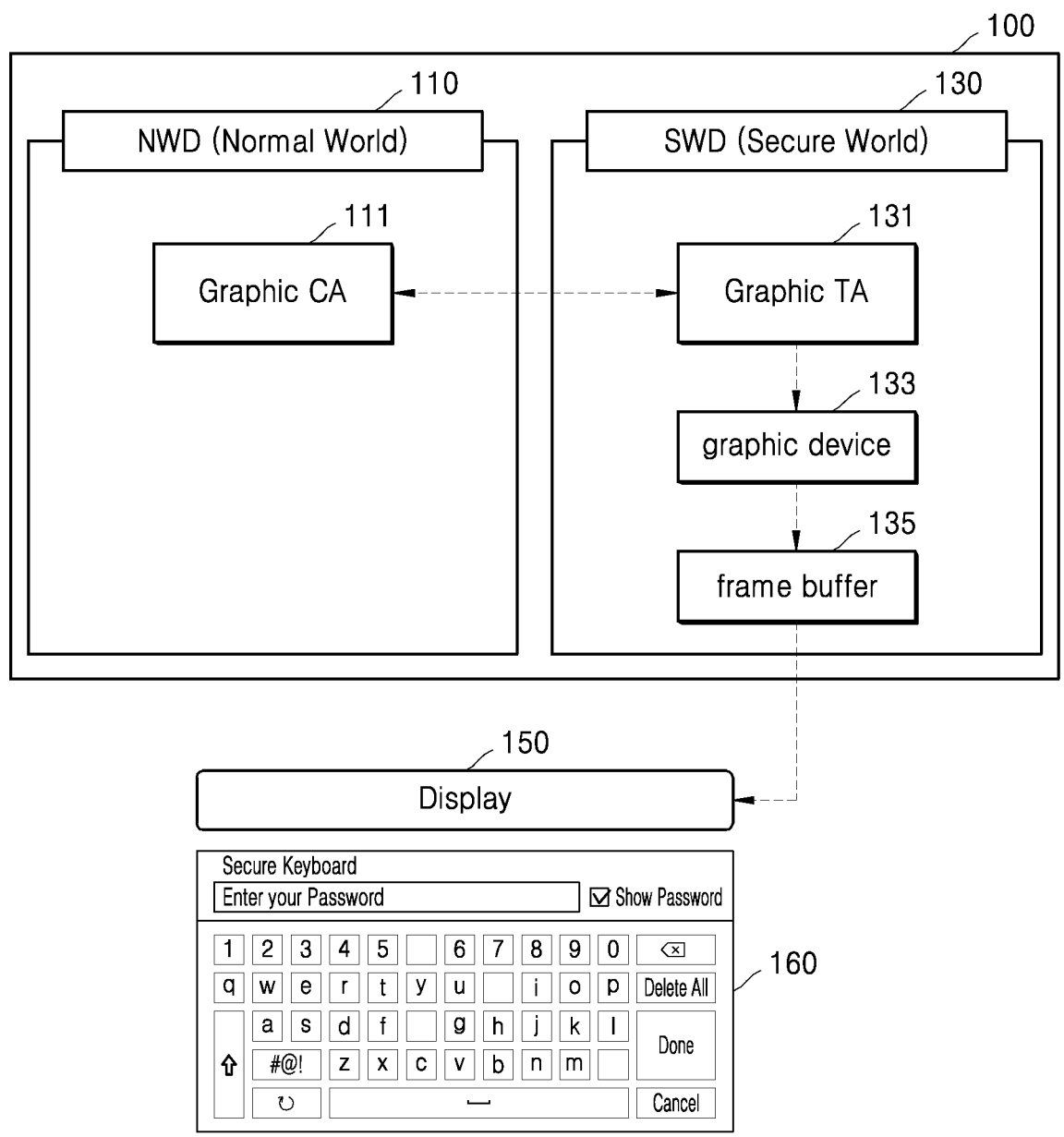
FIG. 1 is a block diagram illustrating an example operating system (OS) divided into a normal world (NWD) and a secure world (SWD) according to an example embodiment of the disclosure.

Reference will now be made in greater detail to various example embodiments of the disclosure, examples of which are illustrated in the accompanying drawings, wherein like reference numerals refer to like elements throughout. In this regard, the example embodiments of the disclosure may have different forms and should not be understood as being limited to the descriptions set forth herein. Accordingly, the embodiments of the disclosure are merely described below, by referring to the figures, to explain various aspects. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or any and all variations thereof.

Some embodiments of the disclosure may be represented by block components and various process operations. All or some of such functional blocks may be implemented by various numbers of hardware and/or software components or any combinations thereof which perform particular functions. For example, functional blocks of the disclosure may be implemented with one or more microprocessors or circuit elements for a particular function. The functional blocks of the disclosure may also be implemented with various programming or scripting languages. Functional blocks may be implemented as an algorithm executed in one or more processors. Furthermore, the disclosure may employ any number of related techniques for electronics configuration, signal processing and/or control, data processing and the like.

Connecting lines and/or connecting members between elements shown in the drawings are intended to merely illustrate functional connections and/or physical or circuit connections. In an actual device, connections between elements may be indicated by replaceable or added various functional connections, physical connections, or circuit connections.

The term used in the embodiments of the disclosure, the terms including "unit", "module", apparatus, or the like, may refer, for example, to a unit for processing at least one function or operation, and may be implemented in hardware, software, or in any combination of hardware and software. The term "unit" or "module" may be implemented by a program that is stored in an addressable storage medium and executable by a processor.

For example, the term "unit", "module", or apparatus may include software components, object-oriented software components, class components and task components, processes, functions, attributes, procedures, subroutines, segments of a program code, drivers, firmware, microcode, circuitry, data, databases, data structures, tables, arrays, and variables, or the like, but the disclosure is not limited thereto.

As mentioned before, electronic devices such as, for example, and without limitation, a computer, a smartphone, a tablet personal computer (PC), a personal digital assistant (PDA), etc., have been used closely with users. As electronic devices personally used by the users have been widely spread and used, user's personal information and/or user-related information input to and/or stored in the electronic devices have also been increasing. The user's personal information and/or the user-related information may include information that has to be security-maintained, for example, and without limitation, personal unique identification information such as a user's resident registration number, etc., a user-set password, a user's credit card number, and the like.

The electronic device may input, process, and/or store the user's personal information and/or the user-related information to perform a task and/or an operation. The user's personal information and/or the user-related information that is input, processed, and/or stored in the electronic device may include information that needs to be protected from hacking.

When, for example, a user uses an Internet banking application executed in the electronic device, the user has to undergo user authorization by inputting a user identification (ID) and a user password to the Internet banking application. In this example, the user ID and the user password are information that has to be protected from hacking. Hereinbelow, information that needs security, such as the user's personal information or the user-related information, may be collectively referred to as 'user information'.

Thus, security is required in the entire procedure of inputting, processing, and/or storing the user information, and the user information needs to be protected from leaking due to an external harmful factor (e.g., malware, etc.) in the procedure of inputting, processing, and/or storing the user information.

As mentioned above, as one of methods of improving security performance by protecting information, e.g., user information, a method of setting a trustzone for use may be taken as an example.

The method of setting the trustzone, which may refer, for example, to a technique for security of hardware mounted on a processor, divides an operating system (OS) that executes the processor into a normal world (NWD) and a secure world (SWD) corresponding to the trustzone. For example, the method of setting the trustzone may divide the hardware (e.g., a memory device, etc.) on which the OS is present into the NWD and the SWD, and makes it impossible for the NWD to access the SWD. According to an example method of setting the trustzone, data and/or a resource that is input to, processed in, and/or stored in the SWD may be protected.

A method of setting the trustzone as one of the methods of improving security performance will be described in greater detail below with reference to FIG. 1.

FIG. 1 is a block diagram illustrating an example OS divided into an NWD and an SWD according to an example embodiment of the disclosure.

Referring to FIG. 1, an OS 100 may be divided into an NWD 110 and an SWD 130 corresponding to a trustzone. The NWD 110 may correspond to a rich execution environment (REE) region, and the SWD 130 may correspond to a trusted execution environment (TEE) region. The REE region has security vulnerability when compared to the TEE region.

For example, assume an example where a user interface (UI) application for receiving and processing user information operates in the REE region. In this example, an external attacker such as malware, etc., may extort user information input to an application through UI screen capturing, etc. To address security vulnerability that may occur in the REE region, a method of setting the trustzone using the SWD corresponding to the TEE region may be used.

According to the method of setting the trustzone, the NWD 110 may not be able to access a resource that is present in the SWD 130. The resource may refer, for example, to i) data input as the OS and/or ii) various forms of data generated, processed, and/or stored in the OS. For example, to address a security problem, such as leakage of user information, etc., that may occur in the procedure of inputting, processing, and/or storing the user information by the processor that executes the OS, at least one operation for inputting, processing, and/or storing the user information may be performed in the SWD 130.

For example, when the user information is input through a UI screen, a UI application used to generate the UI screen may be executed in the SWD 130.

Referring to FIG. 1, an example of the UI screen that receives the user information as an input may include, for example, and without limitation, a secure keyboard UI screen including a secure keyboard 160.

For example, for the Internet banking application executed on an electronic device, e.g., a user's mobile phone, the user first needs to enter information for user authorization into the Internet banking application. The Internet banking application may output the UI screen including the secure keyboard 160 on the display 150 to receive the information for user authorization. The information for user authorization may include a user's ID, a password corresponding to the user's ID, etc., for which security needs to be maintained.

Referring to FIG. 1, to display the UI screen including the secure keyboard 160, an image resource stored in a memory (not shown) of the NWD 110 is loaded in a graphic client application (CA) 111 which then transmits the loaded image resource to the SWD 130. For example, the graphic CA 111 may transmit the loaded image resource to a graphic trusted application (TA) 131.

The graphic TA 131 may operate by directly drawing an image corresponding to the received image resource on a frame buffer 135 using a graphic device 133. The frame buffer 135 may be accessible only in the SWD 130 corresponding to the trustzone, and is not accessible in the NWD 110.

To display the UI screen including the secure keyboard 160, the graphic TA 131 of the SWD 130 may directly generate a required image. For example, the graphic TA 131 may operate by directly drawing the required image on the frame buffer 135 using the graphic device 133.

However, to generate a trustzone UI in the SWD 130, there may be a problem described below.

In comparison to the NWD 110, the SWD 130 corresponding to the trustzone may have limitations in, for example, a memory use amount, in an application, a device, a program, and/or tools used to generate and/or rendering graphics. For example, a trustzone may have a smaller memory capacity than the NWD 110 and may use a secure OS that is a light-weight OS. Thus, the SWD 130 may not receive a support for a graphic rendering technique or tool (e.g., a fault engine, etc.) used in the NWD 110 or may have a difficulty in using the graphic rendering technique or tool in terms of an execution time and a memory capacity.

For example, an image generated in the SWD 130 may not provide multi-language support. For the trustzone UI having to provide the multi-language support, as many images as countries corresponding to the multiple languages have to be generated in advance. For example, to output a UI screen corresponding to any one of languages corresponding to 20 countries supported, the graphic device 133 of the SWD 130 has to previously generate 20 UI screens respectively corresponding to the 20 languages. Thus, a memory resource is consumed in generating and storing 20 images. Upon occurrence of change in supported languages, as many images as countries corresponding to the changed supported languages have to be modified. As a result, cost and time are consumed in maintenance and repair for multi-language change.

Moreover, to previously store a plurality of images, a plurality of generated images have to be loaded and stored in advance in a memory (not shown) e.g., a flash storage) in the SWD 130. Thus, the memory use amount in the SWD 130 increases. The SWD 130 may have a smaller memory capacity than the NWD 110, such that when the plurality of generated images are stored in the memory (not shown) in the SWD 130, the remaining memory capacity is reduced. Thus, an available memory capacity in the SWD 130 is reduced such that the execution of subsequent operations may slow down or even become impossible.

Moreover, when the trustzone UI is changed, a problem may occur in repair of the trustzone UI. For example, because all the required images are generated in advance in the SWD 130, an image corresponding to a UI screen has to be newly generated even when only a part of the UI screen is changed and the other parts are maintained. Thus, when a partial change is required in the UI screen, a previous image may not be used and a new image has to be regenerated, causing a time delay in regeneration of the new image.

In an embodiment of the disclosure, to address the foregoing problems, a trustzone graphic rendering method and a display device using the same for easily and rapidly generating a trustzone UI while improving security performance are disclosed. The trustzone graphic rendering method and the display device using the same will be described in greater detail below with reference to FIGS. 2A through 10.

The trustzone UI generated in an embodiment of the disclosure corresponds to a UI that enables data to be input and/or output through interaction with a user, and may include at least one of various forms of an image, data, and/or a resource.

For example, the trustzone UI may include at least one of a UI screen, image data corresponding to the UI screen, and/or an image resource used for generating the UI screen. The trustzone UI may include at least one of various forms of a screen, image data, and/or a resource, which are related to a UI that needs to maintain security.

Figure 2A:
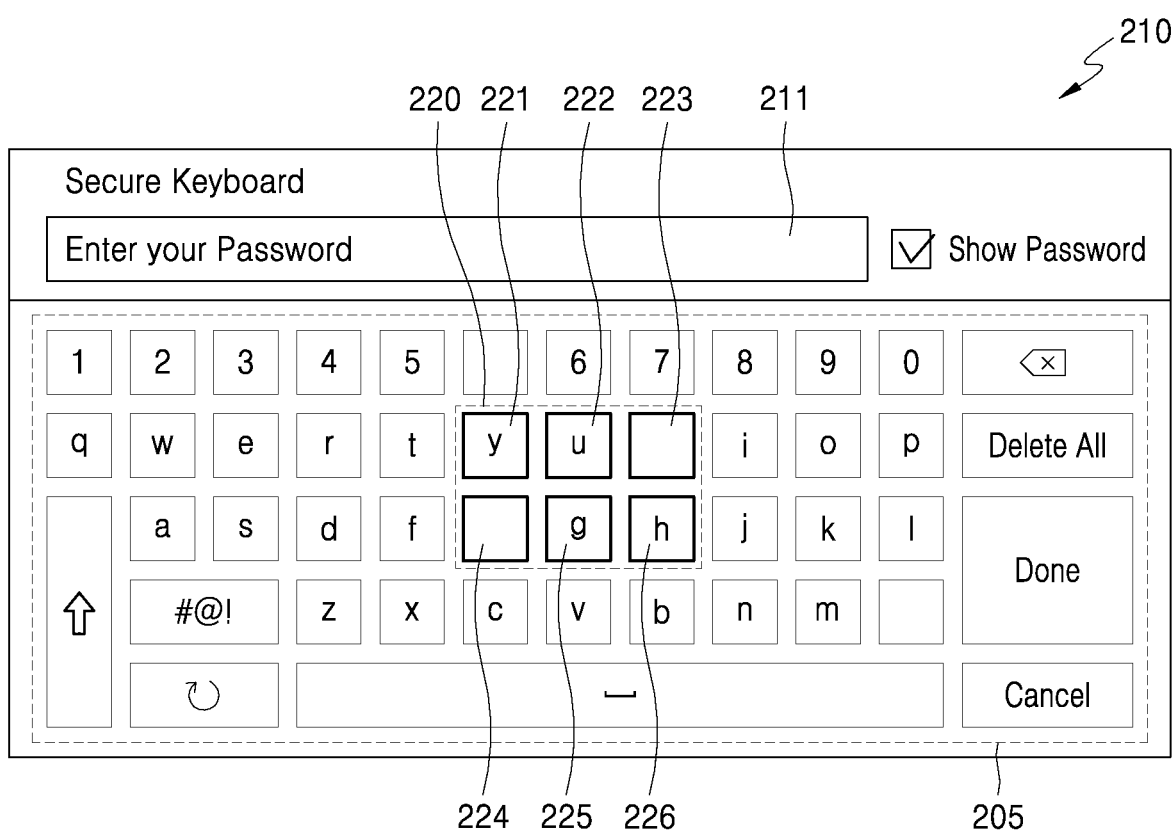
FIG. 2A is a diagram illustrating an example secure keyboard that is output for secure input of information according to an example embodiment of the disclosure.
Figure 2B:
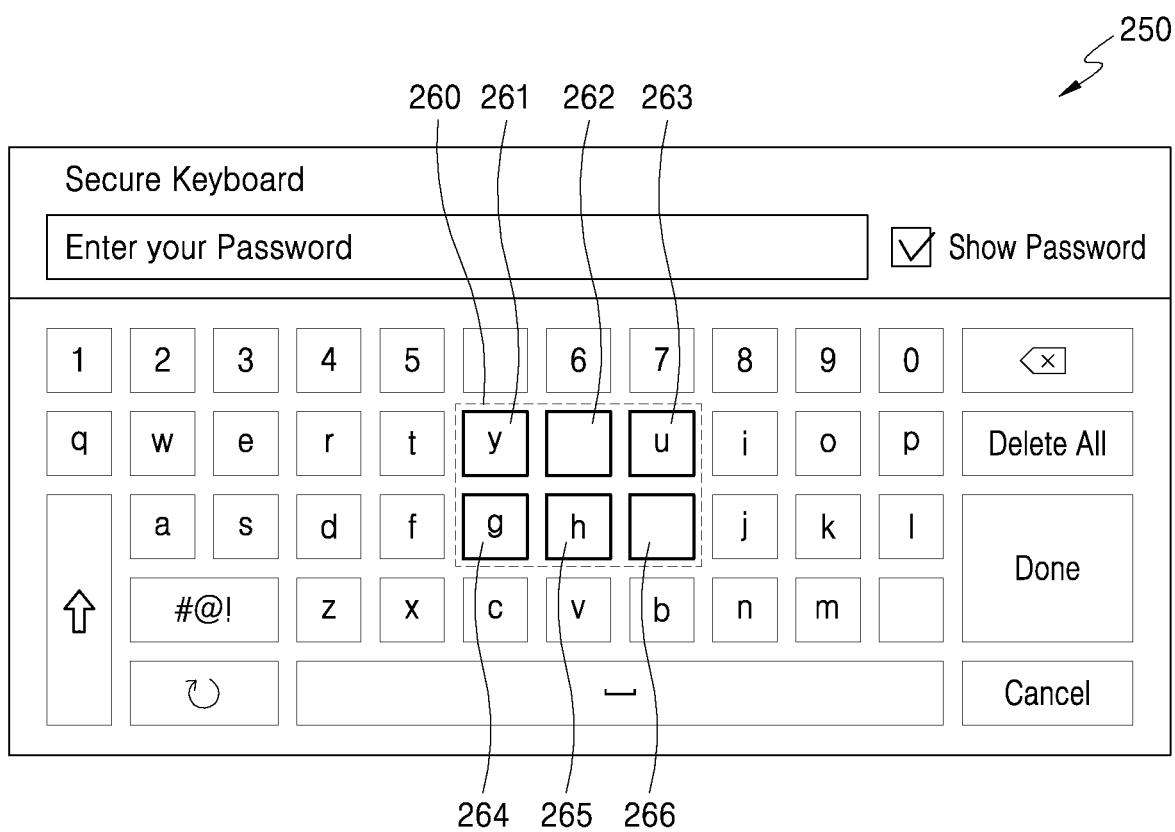
FIG. 2B is another diagram illustrating an example secure keyboard that is output for secure input of information according to an example embodiment of the disclosure.

For example, the trustzone UI may be a secure keyboard illustrated in FIGS. 2A and 2B. In addition, the trustzone UI may be a secure keypad illustrated in FIG. 3.

FIG. 2A is a diagram illustrating an example secure keyboard that is output for secure input of information according to an example embodiment of the disclosure.

FIG. 2B is another diagram illustrating an example secure keyboard that is output for secure input of information according to an example embodiment of the disclosure.

Referring to FIG. 2A, a secure keyboard 210 may include a region 205 where keys for inputting a password are arranged and a region 211 for inputting and displaying the password. In the region 205, a plurality of keys corresponding to at least one of a character, a number, a symbol, and/or a figure for inputting information may be arranged. The keys arranged in the region 205 may vary with a language supported by the secure keyboard 210. FIGS. 2A and 2B illustrate an example where a language supported by the secure keyboard 210 is English. For example, the example is shown where keys corresponding to alphabet characters are arranged in the region 205 of the secure keyboard 210, and indications such as 'Secure Keyboard', 'Enter your Password', 'Show Password', etc., are included.

To prevent and/or reduce the possibility of an external attacker such as malware, etc., from extorting input information, for example, by screen capture, etc., the secure keyboard may output the keys by changing arrangement of the keys at each output time.

For example, the trustzone UI corresponding to the secure keyboard needs to be changed according to at least one of an output timing, an execution timing, and/or a generation timing.

FIG. 2A illustrates the secure keyboard 210 that is output at a timing t1, and FIG. 2B illustrates the secure keyboard 250 that is output at a timing t2 following the timing t1.

Referring to FIGS. 2A and 2B, as the output timing of the secure keyboard 210 is changed, key arrangement in a region 220 of the secure keyboard 210 may be changed.

Referring to FIG. 2A, in the region 220 of the secure keyboard 210 that is output at the timing t1, keys 'y' 221, 'u' 222, null 223, 'h' 226, 'g' 225, and null 224 may, for example, be sequentially arranged in the clockwise direction.

Referring to FIGS. 2A and 2B, the region 220 of FIG. 2A corresponds to a region 260 of FIG. 2B. In the secure keyboard 250 of FIG. 2B, the other parts except for the region 260 are the same as in the keyboard 210 of FIG. 2A and thus a description thereof will not be repeated here.

Referring to FIG. 2B, in the region 260 of the secure keyboard 250 that is output at the timing t2, keys 'y' 261, null 262, 'u' 263, null 266, 'h' 265, and 'g' 264 may, for example, be sequentially arranged in the clockwise direction.

As the output timing of the secure keyboard is changed from t1 to t2, the key 'u' 222 of the region 220 is changed to the null key 262 of the region 260. The null key 223 of the region 220 is changed into the key 'u' 263 of the region 260. The keys 'h' 226 and 'g' 225 and the null key 224 of the region 220 are changed into the null key 266 and the keys 'h' 265 and 'g' 264 of the region 260.

A secure keypad may be an example of a UI for data that needs to be input, processed, and/or stored while maintaining security.

Figure 3:
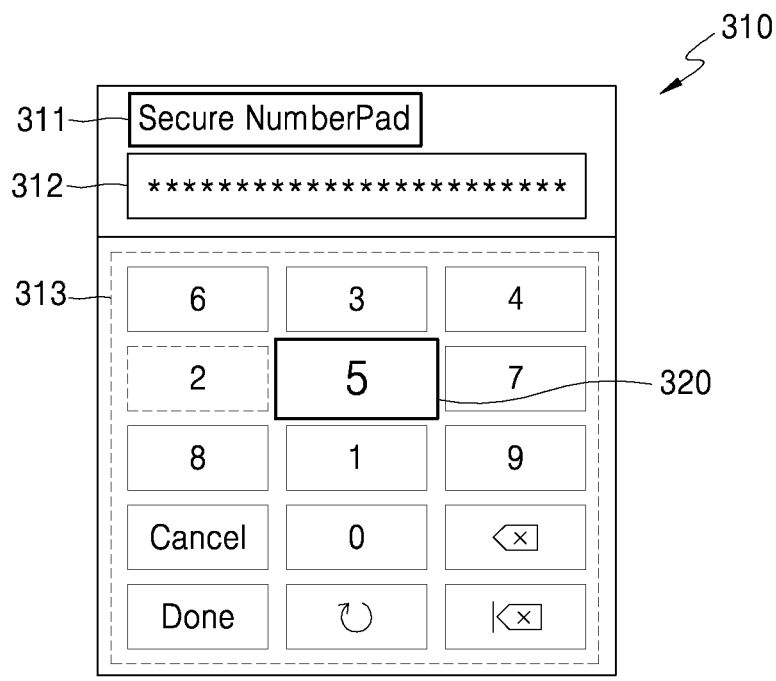
FIG. 3 is a diagram illustrating an example secure keypad that is output for secure input of numbers according to an example embodiment of the disclosure.

FIG. 3 is a diagram illustrating an example secure keypad that is output for secure input of a number according to an example embodiment of the disclosure.

Referring to FIG. 3, a secure keypad 310 may include 'Secure NumberPad' 311 indicating a secure keypad, a region 312 that inputs and displays a password, and a region 313 where keys for inputting numbers are arranged.

In the secure keypad 310, positions of the keys arranged in the region 313 may be changed according to an output timing, as with or similarly to the secure keyboard described in FIGS. 2A and 2B.

Once a key included in the secure keypad 310 is selected, the selected key may be displayed distinguished from the non-selected keys. For example, when a key 320 corresponding to a number '5' is selected, the selected key 320 may be displayed enlarged as illustrated in FIG. 3 and thus may be displayed in a form that is different from the other non-selected keys.

An embodiment of the disclosure discloses a method and apparatus for rendering and outputting a security-required UI screen in an SWD corresponding to a trustzone, like in a UI screen including a secure keyboard illustrated in FIGS. 2A and 2B and/or a secure keypad illustrated in FIG. 3. For example, an embodiment of the disclosure discloses a method and apparatus for rapidly and easily generating a trustzone UI corresponding to a change when a configuration of a UI screen needs to be continuously changed.

Hereinbelow, a UI used in input of data that needs to maintain security performance and rendered in an SWD corresponding to a trustzone may, for example, be referred to as a 'trustzone UI'. The trustzone UI according to an embodiment of the disclosure may include a secure keyboard described with reference to FIGS. 2A and 2B and/or a secure keypad described with reference to FIG. 3.

Herein, the 'trustzone UI' may, for example, and without limitation, include an image corresponding to the UI screen, a resource corresponding to the image corresponding to the UI screen, and/or data corresponding to the image corresponding to the UI screen.

An electronic device according to an embodiment of the disclosure may be any device capable of generating a trustzone UI by performing graphic rendering, and may have various forms.

For example, an electronic device according to an embodiment of the disclosure may include, for example, and without limitation, at least one processor that executes one or more instructions for executing an OS divided into an NWD and an SWD corresponding to a trustzone, and may be any device capable of performing rendering needed for UI generation and/or editing in a region corresponding to the trustzone.

For example, the electronic device according to an embodiment of the disclosure may include a display device such as, for example, and without limitation, a television (TV), a computer, a smartphone, a cellular phone, a tablet personal computer (PC), a digital camera, a camcorder, a laptop computer, a desktop, an electronic(e)-book terminal, a digital broadcasting terminal, a personal digital assistant (PDA), a portable multimedia player (PMP), a navigator, an MP3 player, a wearable device, or the like.

The electronic device according to an embodiment of the disclosure may also include a server device capable of performing UI rendering. In this example, the server device may be connected with an external display device through a wired or wireless network, and may transmit the generated trustzone UI to the external display device. The external display device may display the trustzone UI to allow input of information through interaction with the user.

Hereinbelow, a description will be made of an example where the electronic device according to an embodiment of the disclosure is a display device including a display that outputs a trustzone UI. Thus, display devices 400 and 500 shown in FIGS. 4 and 5, although being referred to as 'display devices', may have aforementioned various forms of an electronic device or a server device.

Figure 4:
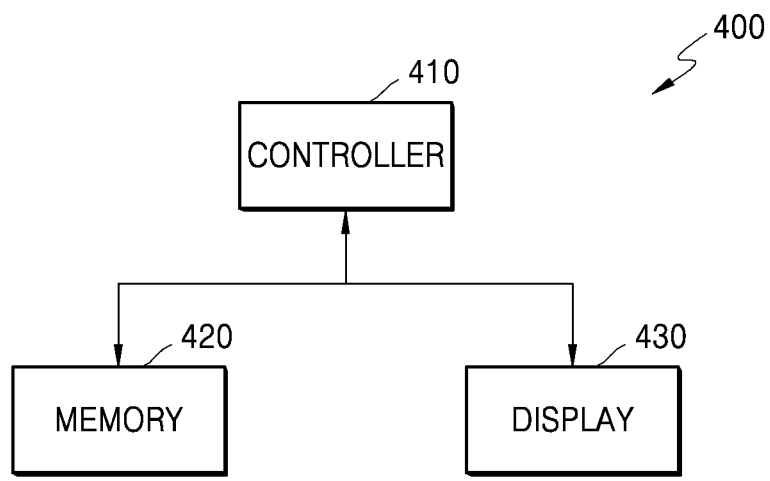
FIG. 4 is a block diagram illustrating an example display device according to an example embodiment of the disclosure.

FIG. 4 is a block diagram illustrating an example display device according to an example embodiment of the disclosure.

Referring to FIG. 4, a display device 400 according to an embodiment of the disclosure may include a controller (e.g., including processing circuitry) 410, a memory 420, and a display 430, and may perform graphic rendering required for trustzone UI generation.

For example, the display device 400 may include the display 430, the memory 420 including one or more instructions, and the controller 410 including at least one processor (not shown) for executing the one or more instructions stored in the memory 420.

The controller 410 may include various processing circuitry, such as, for example, and without limitation, at least one processor (not shown), for executing one or more instructions to execute an OS divided into an NWD and an SWD corresponding to a trustzone. For example, the controller 410 may execute the OS by executing the one or more instructions stored in the memory 420.

The controller 410 may control an overall operation of the display device 400 and a signal flow among internal elements of the display device 400, and process data.

According to an embodiment of the disclosure, the controller 410 may perform operations for rendering the trustzone UI. For example, the controller 410 may perform operations for generating and/or editing the trustzone UI using an image resource.

In an embodiment of the disclosure, the at least one processor included in the controller 410 may be divided into the NWD and the SWD corresponding to the trustzone as described with reference to FIG. 1.

Hardware (not shown) of the controller 410 may be divided into the NWD and the SWD corresponding to the trustzone. Herein, the hardware (not shown) may include, for example, and without limitation, a graphic processing unit (GPU, not shown) forming the at least one processor included in the controller 410, a central processing unit (CPU), and the like. The processor (not shown) may be implemented as a system on chip (SoC) in which at least one core (not shown) and a GPU (not shown) are integrated. For example, hardware of the controller 410, e.g., an SoC, may be divided into the NWD and the SWD corresponding to the trustzone.

Software (not shown, e.g., an OS, etc.) of the controller 410 may be divided into the NWD and the SWD corresponding to the trustzone.

For example, the at least one processor included in the controller 410 may operate to generate an image resource used in generation of a trustzone UI in the NWD, to transmit the image resource from the NWD to the SWD, and to generate the trustzone UI by separating and editing an image resource including a plurality of objects in the unit of an object in the SWD.

Herein, the editing may refer, for example, to changing at least one of a position, a size, a shape, a color, a form, arrangement, and/or an applied language of each object included in the image resource. An example of object-based separation and editing may include a case where when an image resource includes a plurality of objects, positions of at least two objects included in the plurality of objects are changed to rearrange the positions of the objects.

Herein, the trustzone UI may correspond to a UI that enables data to be input and/or output through interaction with a user, and may include at least one of various forms of an image, data, and a resource.

For example, the trustzone UI may be a secure keyboard described with reference to FIGS. 2A and 2B. In another example, the trustzone UI may be a secure keypad described with reference to FIG. 3. In another example, the trustzone UI may correspond to a UI that enables input and/or output of data such that the user performs environment setting, system setting, operation setting, method setting, etc., that has to be performed while maintaining security. In another example, the trustzone UI may correspond to a UI that enables input and/or output of data that needs to maintain security.

For example, when the controller 410 generates an image resource used in generation of a trustzone UI in the NWD, the image resource may include image data corresponding to at least a part of an image that is output as a screen. For example, when the trustzone UI is a UI corresponding to a secure keypad, an image resource generated in the NWD of the controller 410 may include image data corresponding to a secure keypad portion of a UI screen.

The image resource generated by the controller 410 may include a plurality of images and/or data corresponding thereto as well as a single image and/or data corresponding thereto. For example, the image resource generated by the controller 410 in the NWD may include an image corresponding to a secure keypad and an image corresponding to a secure keyboard.

The controller 410 may generate the image resource in the NWD using, for example, at least one graphic toolkit existing in the NWD.

The controller 410 may generate an image resource corresponding to a particular language using the font engine executed in the NWD. For example, when the trustzone UI is a secure keyboard supported by English, the controller 410 may generate an image resource corresponding to the secure keyboard to which English is applied by setting a language applied to the image resource to English through the font engine.

Generally, a larger capacity of memory is allocated to the NWD than to the SWD. Thus, in the controller 410, the NWD does not have a limitation in memory capacity when compared to the SWD. On the other hand, the SWD may have a limitation in storing a tool for graphic rendering, etc., due to a small memory capacity, when compared to the NWD.

In the NWD, there may be various forms of graphic toolkits. For example, examples of graphic toolkits for graphic rendering may include, for example, and without limitation, Enlightenment Foundation Library (ELF), GNU Image Manipulation Program (GIMP) toolkit (GTK), QT toolkit, and the like. In the NWD, there may exist a font engine for graphic rendering. Thus, in the trustzone UI needing multi-language support, a language supported and applied in the trustzone UI may be rapidly and conveniently set and/or changed using the font engine. When the font engine is not used, to change the language applied to the trustzone UI from, for example, English into Korean, each character present in the trustzone UI has to be changed from English into Korean. However, using the font engine, a language type of characters present in the trustzone UI may be rapidly changed at a time.

The NWD may be an environment where a technique, a tool, etc., for graphic rendering all are supported. The SWD may have a limitation in supporting a technique, a tool, etc., for graphic rendering due to the above-described memory capacity limitation, and may not support a technique, a tool, etc., supported in the SWD. For example, in the SWD, due to the memory capacity limitation, none of a graphic toolkit and a font engine may be present.

In an embodiment of the disclosure, an image resource that may be a template used to generate the trustzone UI may be generated in the NWD. Consequently, the image resource may be generated rapidly and easily using the technique and/or tool for graphic rendering, the font engine supporting a multi-language system, or the like, which is present in the NWD.

The controller 410 may separate and edit at least one of a plurality of objects included in the image resource received through the SWD, in units of objects to generate the trustzone UI.

The object may, for example, be a key corresponding to a minimum semantic unit of information to be input through the trustzone UI. The object may, for example, and without limitation, be a minimum unit for identifying a character, a number, a figure, and a symbol included in the trustzone UI. The object may also be each operation execution key included in the trustzone UI. The object may also be one meaningful word or sentence included in the trustzone UI.

The controller 410 may separate and edit an image resource including a plurality of objects in units of objects in the SWD.

As described with reference to FIGS. 2A and 2B, a secure keyboard, etc., for secure input needs to output a UI after changing a form of a secure keyboard every output time. In this example, the controller 410 may generate an image corresponding to a changed trustzone UI by modifying only at least one object corresponding to a changed part in a template image included in an image resource, instead of newly generating an image corresponding to the changed trustzone UI as a whole.

For example, the controller 410 may separate and edit, in units of objects, only at least one object needing to be changed among a plurality of objects included in an image resource received and stored in the SWD. Object-based editing may refer, for example, to any case where a change occurs in at least one of a position, a size, a color, a form, arrangement, a shape, and/or an applied language in at least one of the objects included in the image resource.

For example, object-based editing may, for example, include i) at least two objects among a plurality of objects included in the UI are rearranged by changing positions of the at least two objects, ii) at least one object separated is deleted and/or changed, iii) at least one object is added to the at least one object separated, iv) at least one object is generated and added to existing at least one object, and the like.

The controller 410 may include a memory having stored therein at least one program for executing the above-described operations and operations to be described below and at least one processor executing at least one program stored.

For example, the controller 410 may include a RAM (not shown) that stores a signal or data input from outside the display device 400 and/or is used as a storage region corresponding to various tasks performed by the display device 400, a ROM (not shown) having stored therein a control program for controlling the display device 400, and at least one processor (not shown). As the ROM (not shown) that is a non-volatile memory device included in the controller 410, a flash memory may be included.

The processor (not shown) may include a graphic processing unit (GPU, not shown) for processing graphics corresponding to video. The processor (not shown) may be implemented as a system on chip (SoC) in which a core (not shown) and a GPU (not shown) are integrated. The processor (not shown) may include a single core, a dual core, a triple core, a quad core, and a core of any multiple thereof.

The memory 420 may include one or more instructions. For example, the memory 420 may include one or more instructions performed or executed by at least one processor (not shown) included in the controller 410. The processor (not shown) included in the controller 410 may control at least one instruction stored in the memory 420 to be executed such that an operation for rendering the trustzone UI is executed.

In an embodiment of the disclosure, the memory 420 may have stored therein at least one program including instructions for executing the above-described operations.

The memory 420 may be implemented as being included in the controller 410. In this case, the controller 410 may include the memory 420 and at least one processor (not shown) to control operations executed in the display device 400 and may control other components included in the display device 400 to execute a particular operation.

The memory 420 may include particular data and at least one program including instructions for executing a particular operation.

The memory 420 may include a storage medium of, for example, and without limitation, at least one type of a flash memory type, a hard disk type, a multimedia card micro type, a card type memory (e.g., a secure digital (SD) or extreme digital (XD) memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like.

The display 430 may output an image corresponding to video data through an internally included display panel to allow the user to visually recognize the video data.

In an embodiment of the disclosure, the display 430 may display an image corresponding to a trustzone UI rendered by at least one processor (not shown) included in the controller 410.

Operations executed by at least one processor included in the controller 410 will be described in greater detail below with reference to FIGS. 6 through 10.

Figure 5:
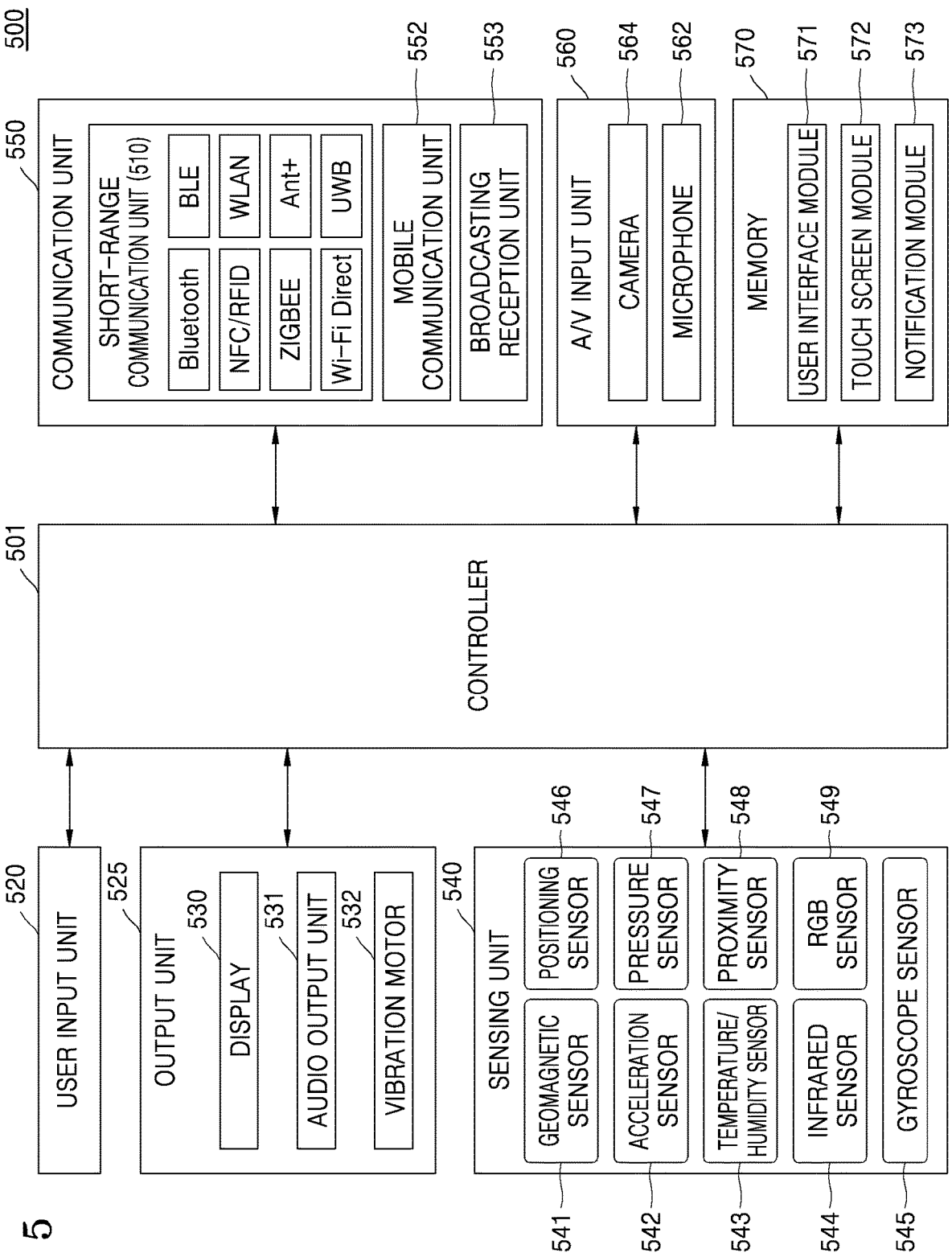
FIG. 5 is a block diagram illustrating an example display device according to another example embodiment of the disclosure.

FIG. 5 is a block diagram illustrating another example display device according to another example embodiment of the disclosure.

A display device 500, a controller (e.g., including processing circuitry) 501 including at least one processor, a memory 570, and a display 530 illustrated in FIG. 5 may correspond to the display device 400, the controller 10 including the at least one processor, the memory 420, and the display 430 illustrated in FIG. 4. Thus, when the display device 500 is described, a description redundant to that made with reference to FIGS. 1 through 4 will not be provided.

As illustrated in FIG. 5, the display device 500 may further include a user input unit (e.g., including input circuitry) 520, an output unit (e.g., including output circuitry) 525, a sensing unit (e.g., including sensing circuitry and/or sensors) 540, a communication unit (e.g., including communication circuitry) 550, an audio/video (NV) input unit (e.g., including A/V input circuitry) 560, and a camera 564 as well as the controller 501 including the at least one processor, the memory 570, and the display 530.

The user input unit 520 may include various input circuitry through which a user inputs data for controlling the display device 500. For example, the user input unit 520 may include, but is not limited to, a keypad, a dome switch, a touch pad (a capacitive overlay type, a resistive overlay type, an infrared beam type, a surface acoustic wave type, an integral strain gauge type, a piezoelectric effect type, etc.), a jog wheel, a jog switch, etc.

The user input unit 520 according to an embodiment of the disclosure may receive an input of particular information through the trustzone UI. For example, the input may include, but is not limited to, an input to touch a region of the trustzone UI output on the display 530. For example, a region where a particular key is arranged. Once the region where the particular key is arranged is touched, the user input unit 520 may sense the touch and receive an input of data corresponding to a particular key.

The output unit 525 may include various output circuitry and output an audio signal, a video signal, and/or a vibration signal, and may include the display 530, an audio output unit (e.g., including audio output circuitry) 531, and a vibration motor 532.

The display 530 may display information processed in the display device 500. For example, the display 530 according to an embodiment of the disclosure may output the trustzone UI.

The audio output unit 531 may include various audio output circuitry and outputs audio data received from the communication unit 550 or stored in the memory 570. The audio output unit 531 outputs an audio signal related to a function (e.g., a call signal receiving sound, a message receiving sound, an alarm sound, etc.) performed in the display device 500.

The controller 501 may include various processing circuitry and control an overall operation of the display device 500 and a signal flow among internal elements of the display device 500, and process data. The controller 501 may execute an operating system (OS) and various applications stored in the memory 570 or a memory (not shown) internally included in the controller 501, when a user input is input and/or a preset and stored condition is satisfied.

The controller 501 according to an embodiment of the disclosure may execute one or more instructions stored in the memory 570 to generate an image resource used in generation of a trustzone UI in the NWD, to transmit the image resource from the NWD to the SWD, and to generate the trustzone UI by separating and editing an image resource including a plurality of objects in the unit of an object in the SWD.

The sensing unit 540 may include various sensing circuitry and/or sensors and sense a state of the display device 500 and/or a state near the display device 500, and may deliver sensed information to the controller 501.

The sensing unit 540 may include, but is not limited to, at least one of a geomagnetic sensor 541, an acceleration sensor 542, a temperature/humidity sensor 543, an infrared sensor 544, a gyroscope sensor 545, a positioning sensor (e.g., a global positioning system (GPS)) 546, a pressure sensor 547, a proximity sensor 548, and/or an RGB sensor 549. A function of each sensor may be intuitively understood from a name of each sensor by those of ordinary skill in the art, and thus will not be described in detail.

The communication unit 550 may include one or more elements that enable the display device 500 to communicate with another device (not shown). The other device may be, but not limited to, a computing device such as the display device 500 or a sensing device. For example, the communication unit 550 may include various communication circuitry, such as, for example, and without limitation, a short-range communication unit 510, a mobile communication unit 552, and a broadcasting reception unit 553.

The short-range communication unit 510 may include, but is not limited to, a Bluetooth communication unit, a Bluetooth Low Energy (BLE) communication unit, a near field communication/radio frequency identification (NFC/RFID) unit, a wireless local area network (WLAN) (Wi-Fi) communication unit, a ZigBee communication unit, an infrared Data Association (IrDA) communication unit (not shown), a Wi-Fi Direct (WFD) communication unit, an ultra-wideband (UWB) communication unit, and an Ant+ communication unit.

The mobile communication unit 552 may include various communication circuitry that transmits and/or receives a radio signal to and/or from at least one of a base station, an external terminal, and/or a server over a mobile communication network. Herein, the radio signal may include various forms of data corresponding to transmission/reception of a voice call signal, a video communication call signal, and/or a text/multimedia message.

The broadcasting reception unit 553 may include various communication circuitry and receives a broadcast signal and/or broadcasting-related information from an external source through a broadcasting channel. The broadcasting channel may include a satellite channel and a terrestrial channel. According to implementation examples, the display device 500 may not include the broadcasting reception unit 553.

The A/V input unit 560 may include various input circuitry that inputs an audio signal or a video signal, and may include, for example, and without limitation, a camera 564, a microphone 562, and the like. The camera 564 obtains an image frame such as a still image or a moving image in a video communication mode or a photographing mode through an image sensor. The image captured by the image sensor is processed by the controller 501 or a separate image processor (not shown).

The microphone 562 receives an external audio signal and processes the received signal into electric voice data. For example, the microphone 562 may receive an audio signal from an external device or the user. The microphone 562 may receive a user's voice input. The microphone 562 may use various noise cancellation algorithms for canceling noise generated during reception of the external audio signal.

The programs stored in the memory 570 may be classified into a plurality of modules depending on a function thereof, e.g., a user interface (UI) module 571, a touch screen module 572, a notification module 573, and the like.

The UI module 571 may provide a specialized UI or graphic UI (GUI) interworking with the display device 500 for each application. The touch screen module 572 may sense a touch gesture of a user on a touch screen and delivers information about the touch gesture to the controller 501. The touch screen module 572 according to an embodiment of the disclosure may recognize and analyze a touch code. The touch screen module 572 may be configured with separate hardware including a controller.

In an embodiment of the disclosure, the UI module 571 may include a program for executing a particular operation to generate or edit a UI. For example, the UI module 571 may include a processor (not shown) including a program for executing a particular operation to generate or edit a UI.

The notification module 573 may generate a signal for notifying of an occurrence of an event of the display device 500. Examples of the event occurring in the display device 500 may include, for example, and without limitation, call signal reception, message reception, key signal input, schedule notification, and the like. The notification module 573 may output a notification signal in the form of a video signal through the display 230, in the form of an audio signal through the audio output unit 522, and/or in the form of a vibration signal through the vibration motor 523.

Hereinbelow, with reference to FIGS. 6 through 9B, a more detailed description will be made of operations executed by the controller 410 of the display device 400 to generate the trustzone UI.

Figure 6:
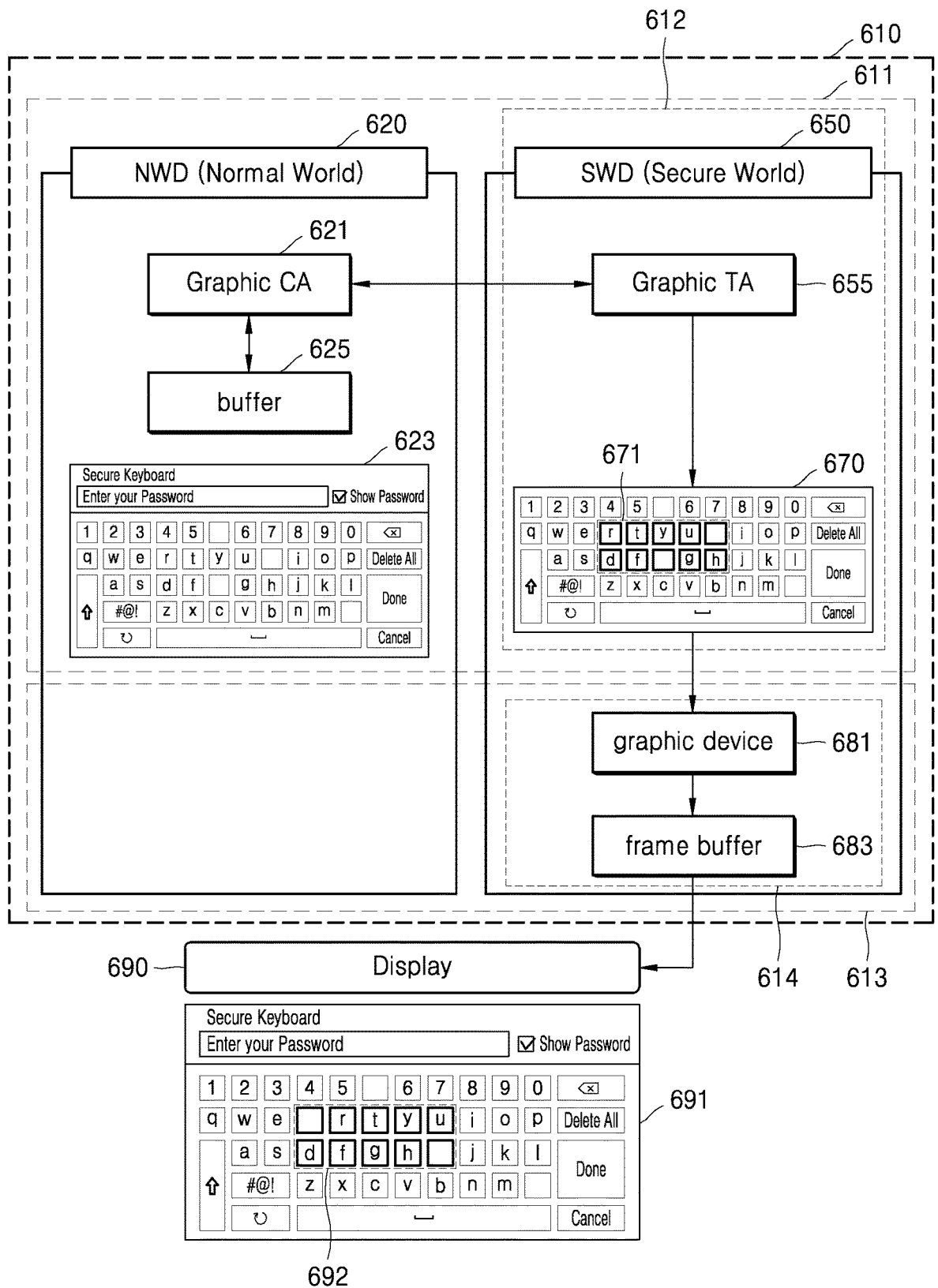
FIG. 6 is a diagram illustrating an example operation of a controller of a display device according to an example embodiment of the disclosure.

FIG. 6 is a diagram illustrating an example operation of a controller of a display device according to an example embodiment of the disclosure.

Figure 7:
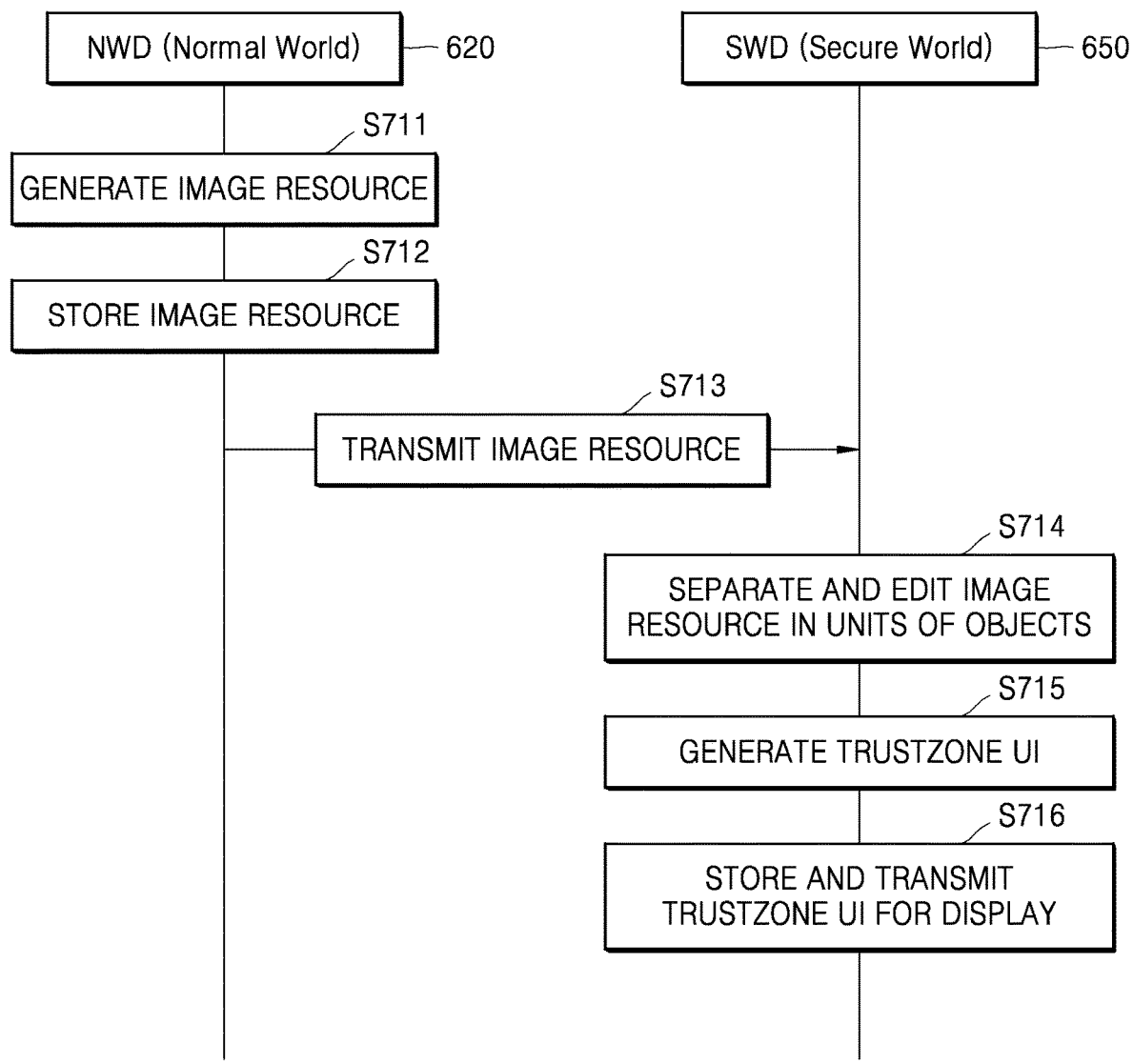
FIG. 7 is a flow diagram illustrating an example operation of generating a trustzone user interface (UI) according to an example embodiment of the disclosure.

FIG. 7 is a flow diagram illustrating an example operation of generating a trustzone UI according to an example embodiment of the disclosure.

Figure 8A:
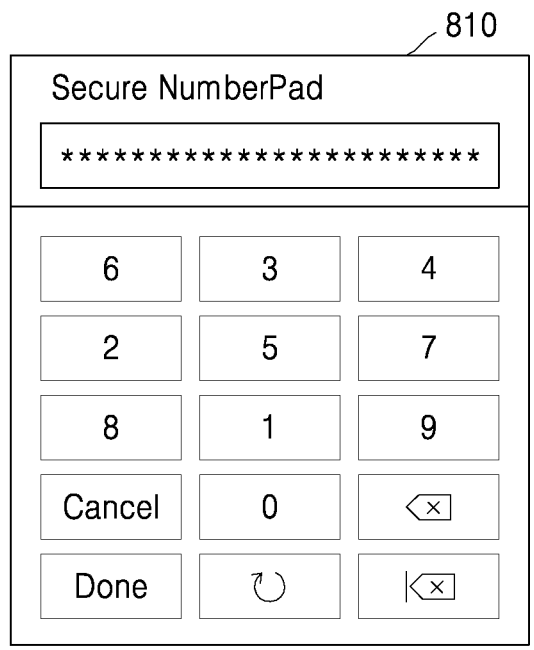
FIG. 8A is a diagram illustrating an example image resource corresponding to a secure keypad according to an example embodiment of the disclosure.

FIG. 8A is a diagram illustrating an example image resource corresponding to a secure keypad according to an example embodiment of the disclosure.

Figure 8B:
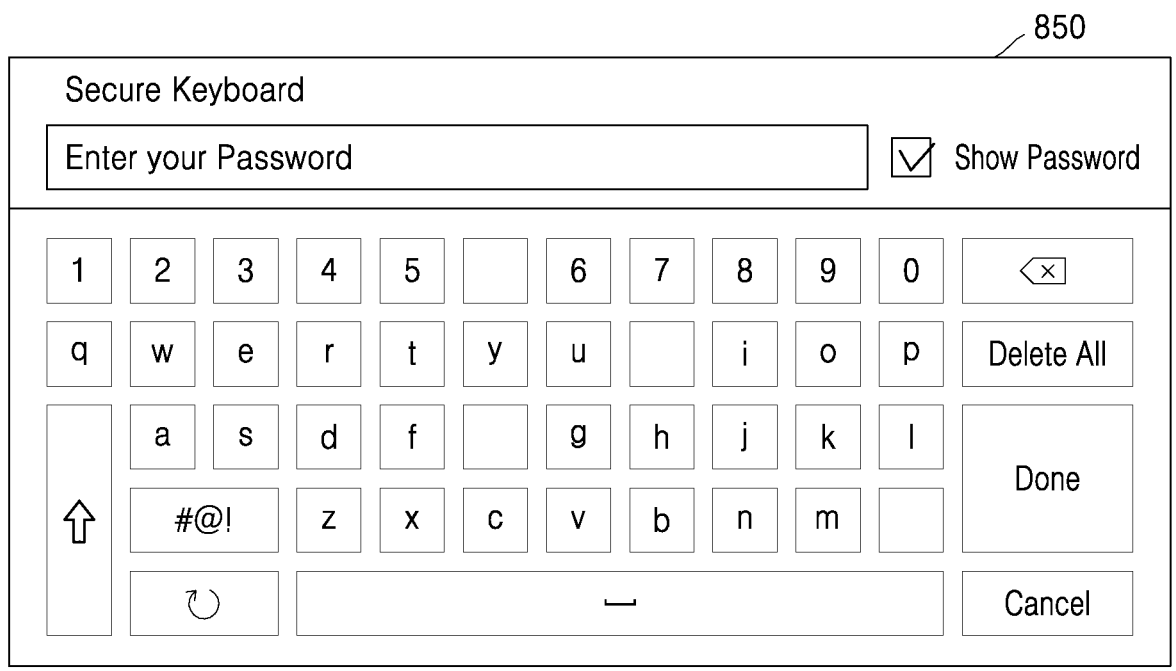
FIG. 8B is a diagram illustrating an example image resource corresponding to a secure keyboard according to an example embodiment of the disclosure.

FIG. 8B is a diagram illustrating an example image resource corresponding to a secure keyboard according to an example embodiment of the disclosure.

FIG. 9A is a diagram illustrating an example editing operation of a secure keyboard before editing the secure keyboard according to an example embodiment of the disclosure. FIG. 9B is a diagram illustrating an example editing operation of a secure keyboard after editing the secure keyboard according to an example embodiment of the disclosure.

A controller 610 and a display 690 illustrated in FIG. 6 may correspond to the controller 410 and the display 430 illustrated in FIG. 4. The controller 610 and the display 690 illustrated in FIG. 6 may also correspond to the controller 501 and the display 530 illustrated in FIG. 5. An NWD 620 and an SWD 650 corresponding to a trustzone, which are illustrated in FIG. 6, may correspond to the NWD 110 and the SWD 130 described above with reference to FIG. 1. Thus, when the controller 610 is described, a description redundant to that made with reference to FIGS. 1 through 5 will not be provided.

In FIGS. 6 and 7, the same element will be referred to as the same reference numeral. For example, in FIGS. 6 and 7, the NWD is indicated by reference numeral '620' and the SWD is indicated by reference numeral '650'.

Referring to FIG. 6, the controller 610 may be divided into the NWD 620 and the SWD 650 corresponding to the trustzone as described with reference to FIG. 1. For example, at least one processor included in the controller 610 may be divided into the NWD 620 and the SWD 650 corresponding to the trustzone as described with reference to FIG. 1. Herein, the controller 610, for example, the at least one processor (not shown) may have mounted therein an OS. Thus, the OS mounted in the controller 610 may be formed divided into the NWD and the SWD corresponding to the trustzone.

Referring to FIG. 6, a graphic client application (CA) 621 and a buffer 625 may be present in the NWD 620. A graphic trusted application (TA) 655, a buffer (not shown), a graphic device 681, and a frame buffer 683 may be present in the SWD 650. Although the buffer 625 will be illustrated and described as an example of a memory present in the NWD 620 in FIG. 6, various forms of memories may also be included. A buffer (not shown) and a frame buffer 683 will be illustrated and described as an example of a memory present in the SWD 650 in FIG. 6, but various forms of memories may be included.

Referring to FIGS. 6 and 7, in an embodiment of the disclosure, an image resource needed to generate a trustzone UI in the NWD 620 is generated in operation S711. Herein, the image resource generated in the NWD 620 may refer, for example, to a template image corresponding to the trustzone UI.

The trustzone UI may include, for example, and without limitation, at least one of a UI screen, image data corresponding to the UI screen, and/or an image resource used for generating the UI screen, or the like, in which data may be input or output through the UI screen based on interaction with the user. For example, the trustzone UI may be a secure keyboard described with reference to FIGS. 2A and 2B. In another example, the trustzone UI may be a secure keypad described with reference to FIG. 3.

The following description will be made of an example where a trustzone UI generated and/or edited in an embodiment of the disclosure is a UI corresponding to a secure keyboard.

Referring to FIGS. 6 and 7, at least one processor (not shown) included in the controller 610 may generate an image resource used for trustzone UI generation by using the graphic CA 621 present in the NWD 620.

Herein, the graphic CA 630 may, for example, exist in a pair with the graphic TA 655, and the graphic CA 621 may transmit an image resource to the graphic TA 655.

For example, the controller 610 may generate an image used for trustzone UI generation using a tool for graphic rendering present in the NWD 620, e.g., an image resource generator (not shown) may generate the image resource by using a graphic toolkit present and/or supported in the NWD 620.

The image resource generated in the NWD 620 of the controller 610 will be described in greater detail below with reference to FIGS. 8A and 8B.

The image resource may, for example, be a resource used for trustzone UI generation, and may be an image corresponding to the trustzone UI.

For example, when the trustzone UI is a secure keypad for secure input of a number, the image resource may include a template image indicating a secure keypad 810 as illustrated in FIG. 8A.

The image resource may be a template of the trustzone UI, and may be generated not to show distinguishment between a selected key highlighted like the key 320 corresponding to the number '5' and non-selected keys in FIG. 3. For example, comparing the secure keypad 310 illustrated in FIG. 3 with the secure keypad 810 illustrated in FIG. 8A, selection or highlight of keys included in the secure keypad 810 is not shown.

When the trustzone UI is a secure keyboard for secure input of information including at least one of a character, a number, a figure, or a symbol, the image resource may include a template image 850 indicating a secure keyboard as illustrated in FIG. 8B.

The image resource generated in the controller 610 may include a plurality of objects. Herein, the object may be a key corresponding to a minimum semantic unit of information to be input through the trustzone UI. The object may be a minimum unit for identifying a character, a number, a figure, and a symbol included in the trustzone UI. The object may also be each operation execution key included in the trustzone UI. The object may also be one meaningful word or sentence included in the trustzone UI.

For example, in the secure keypad 810 illustrated in FIG. 8A, each of numbers '0' to '9' may be one object and each of operation execution keys 'Cancel', 'Done', 'Return', etc., may be one object. One meaningful sentence 'Secure NumberPad' may also be one object.

Template images corresponding to a secure keypad and a secure keyboard may have various forms as well as those illustrated in FIGS. 8A and 8B.

The generated image resource may be stored in a memory present in the NWD 620, e.g., the buffer 625 in operation S712.

For example, the buffer 625 may be a two-dimensional (2D) canvas buffer. The controller 610 may generate an image resource by drawing a template corresponding to the trustzone UI on the 2D canvas buffer using an image resource generator (not shown) present in the NWD 620.

For example, the image resource generated in the NWD 620 may include an image of the secure keyboard 623, data for generating an image corresponding to the secure keyboard 623, image data corresponding to the secure keyboard 623, and so forth. The image of the secure keyboard 623 generated as the image resource may be a template image corresponding to the trustzone UI.

As described above, in the NWD, there may be various forms of graphic toolkits. For example, examples of graphic toolkits for graphic rendering may include, without limitation, ELF, GTK, QT toolkit, and the like.

The NWD may be an environment where a technique, a tool, etc., for graphic rendering all are supported. The SWD may have a limitation in supporting a technique, a tool, etc., for graphic rendering due to the above-described memory capacity limitation, and may not support a technique, a tool, etc., supported in the SWD.

In an embodiment of the disclosure, an image resource that may be a template used to generate the trustzone UI may be generated in the NWD. Consequently, the image resource may be generated rapidly and easily using the technique or tool for graphic rendering or the like, which is present in the NWD.

Once the image resource is generated, the controller 610 may transmit the image resource to the SWD 650 in the SWD 650 in operation S713. For example, the graphic CA 630 may load an image resource stored in the buffer 625 and transmit the loaded image resource to the graphic TA 655. Each of the graphic CA 630 and the graphic TA 655 may include a shared memory (not shown), and may transmit and receive the image resource by using the shared memory (not shown) internally included therein.

The controller 610 may store the image resource received by the SWD 650 in a buffer (not shown) that is a memory in the SWD 650. Herein, the image resource stored in the buffer (not shown) may be data corresponding to the secure keyboard 623, and may be expressed as the secure keyboard 670 illustrated in FIG. 6. For example, the data corresponding to the secure keyboard 670 may be an image resource corresponding to the secure keyboard 623 transmitted from the graphic CA 621. Thus, the secure keyboard 670 may correspond to the secure keyboard 623.

For example, upon receiving the image resource from the SWD 650, the controller 610 may store the image resource in the memory of the SWD 650 that is not accessible from the NWD 620 and from outside the OS mounted in the controller 610. An image resource stored in the memory of the SWD 650, e.g., a buffer (not shown) may be data corresponding to the secure keyboard 670.

The controller 610 may separate and edit an image resource including a plurality of objects in units of objects in the SWD 650 in operation S714. For example, the graphic device 681 included in the SWD 650 may perform graphic rendering. The graphic device 681 may generate an image or data corresponding to the trustzone UI by performing the separating and editing operations in units of objects using the image resource. The image or data corresponding to the generated trustzone UI may be stored in the frame buffer 683.

For example, the controller 610 may generate the trustzone UI corresponding to the secure keyboard 691 by editing the secure keyboard 670 that is the image resource, in the SWD 650. For example, a secure keyboard before being edited may be the secure keyboard 670 and a secure keyboard after being edited may be the secure keyboard 691. For example, by rearranging objects included in a particular region 671 in the secure keyboard 670, the secure keyboard 691 may be generated. Thus, arrangement of objects arranged in a particular region 692 of the secure keyboard 691 may differ from that of the objects included in the particular region 671 in the secure keyboard 670.

Object-based separation and editing will be described in greater detail below with reference to FIGS. 9A and 9B.

As described with reference to FIGS. 2A and 2B, a secure keyboard, etc., for secure input needs to output a UI after changing a form of a secure keyboard every output time. In this case, the controller 610 may generate an image corresponding to a changed trustzone UI by modifying only at least one object corresponding to a changed part in a template image included in an image resource, instead of newly generating an image corresponding to the changed trustzone UI as a whole.

For example, the controller 610 may separate and edit, in units of objects, only at least one object needing to be changed among a plurality of objects included in an image resource received and stored in the SWD 650.

A secure keyboard 910 illustrated in FIG. 9A may correspond to the template image 850 indicating the secure keyboard illustrated in FIG. 8B. For example, the secure keyboard 910 may correspond to the template included in the image resource. The secure keyboard 910 may correspond to the secure keyboard 670 described with reference to FIG. 6.

In the secure keyboard 910 illustrated in FIG. 9A, to generate the trustzone UI by changing arrangement of keys included in a particular region 911, the controller 610 may separate only at least one object corresponding to a changed part and modify the separated objects, thus generating the trustzone UI having an intended form in operation S715. Herein, the particular region 911 may correspond to the particular region 671 described with reference to FIG. 6.

Hereinbelow, a description will be made of operations performed in the controller 610 to change a region 911 of the keyboard 910 illustrated in FIG. 9A into a region 951 of a secure keyboard 950 illustrated in FIG. 9B.

For reference, the region 911 illustrated in FIG. 9A may correspond to the region 951 illustrated in FIG. 9B. The secure keyboard 950 illustrated in FIG. 9B may correspond to the secure keyboard 670 described with reference to FIG. 6. Herein, the particular region 951 may correspond to the particular region 692 described with reference to FIG. 6.

Referring to FIGS. 9A and 9B, the controller 610 may separate objects to be changed, in units of objects. For example, the controller 610 may separate from the secure keyboard 910 that is the image resource, objects to be changed, 'r' 921, 't' 922, 'y' 923, 'u' 924, null 925, null 928, 'g' 929, and 'h' 930. Each of the separated objects may be changed according to a matter to be changed.

For example, 'r' 921, 't' 922, 'y' 923, 'u' 924, null 925, null 928, 'g' 929, and 'h' 930 of the secure keyboard 910 may be changed into null 961, 'r' 962, 't' 963, 'y' 964, 'u' 965, 'g' 968, 'h' 969, and null 970, respectively. That is, to change arranged positions of at least one object included in the secure keyboard 910, 'r' 921, 't' 922, 'y' 923, 'u' 924, null 925, null 928, 'g' 929, and 'h' 930, object-based editing may be performed. Thus, the secure keyboard 950 corresponding to the trustzone UI may be generated.

The secure keyboard 950 generated by the aforementioned object-based separation and editing may be an image corresponding to the trustzone UI.

In FIGS. 9A and 9B, a case where arranged positions of objects are changed has been described as an example of object-based separation and editing. However, object-based editing may mean any case where a change occurs in at least one of a color, a form, arrangement, a shape, or an applied language in at least one of the objects included in the image resource.

For example, object-based editing may include, without limitation, cases i) at least one object separated is deleted or changed, ii) at least one object is added to the at least one object separated, iii) at least one object is generated and added to existing at least one object, and the like.

The controller 610 may store the trustzone UI generated by the above-described object-based separation and editing in the frame buffer 683 included in the SWD 650 in operation S716. The trustzone UI loaded from the frame buffer 683 may be displayed through the display 690. The display 690 may correspond to the display 430 illustrated in FIG. 4.

In light of the OS, the controller 610 may be divided into a user null 611 and a kernel null 613. Operations executed in the user null 611 may be referred to as a user mode, and operations executed in the kernel null 613 may be referred to as a kernel mode.

For example, the user mode may refer, for example, to a mode in which a process or memory region other than a given memory region in a corresponding region is not accessible. For example, when a graphic rendering operation is executed in a user null 612 of the SWD 650, the graphic TA 655 may access a memory (not shown) present in the user null 612 of the SWD 650 and execute the graphic rendering operation. However, a space other than the user null 612, e.g., the buffer 625 present in the NWD 620 is not accessible.

The kernel mode may refer, for example, to a mode in which a process or memory region other than a corresponding region is accessible. For example, the graphic device 681 may access a memory (not shown) present in the user null 612 to retrieve and edit an image resource.

As described above, in an embodiment of the disclosure, in the SWD 650 that obtains an image resource corresponding to a template of a trustzone UI, at least one object included in the image resource is separated and edited, thereby rapidly generating an intended trustzone UI without needing to newly generate an image corresponding to a trustzone UI to be changed correspondingly each time when the trustzone UI is changed.

To generate a trustzone UI, a plurality of object images are stored in the SWD 650 and previously stored object images are rendered to generate an intended trustzone UI. In this example, all of the plurality of object images have to be stored in the SWD 650, such that the amount of use of a memory included in the SWD 650, e.g., a flash storage may increase. Moreover, as the amount of use of the flash storage increases, a memory capacity needed to process other tasks is reduced. Furthermore, to generate a trustzone UI that supports multiple languages, sets of as many object images as language types of the supported multiple languages have to be stored. As a result, the above-described increase in the amount of use of the flash storage becomes worse.

Moreover, each time when the trustzone UI is changed, rendering has to be performed for complete image generation using object images, increasing an operation execution time.

As described above, in an embodiment of the disclosure, the template corresponding to the trustzone UI is transmitted as an image resource from the NWD 620 to the SWD 650, and object-based separation and editing are performed using the image resource received in the SWD 650, thus generating the trustzone UI. Thus, each time when the trustzone UI is changed, an object to be changed is edited without a need to perform rendering for complete new image generation, thereby reducing a time and a memory capacity consumed in maintenance and repair of the trustzone UI. Accordingly, the intended trustzone UI may be generated rapidly and conveniently.

Figure 10:
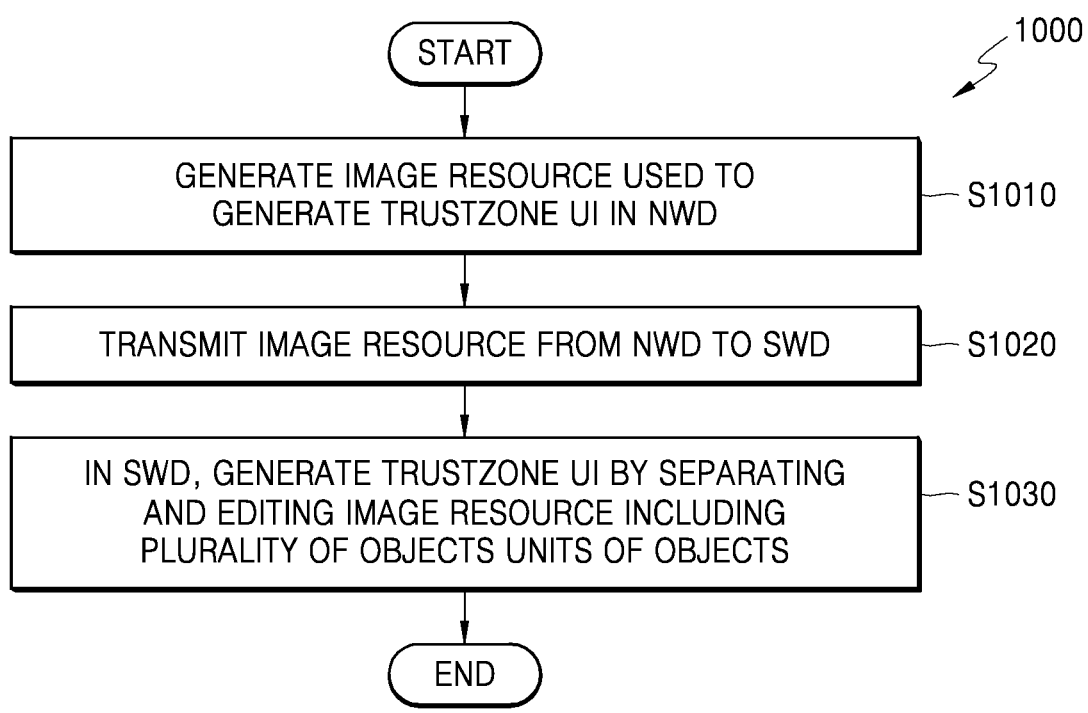
FIG. 10 is a flowchart illustrating an example trustzone graphic rendering method according to an example embodiment of the disclosure.

FIG. 10 is a flowchart illustrating an example trustzone graphic rendering method according to an example embodiment of the disclosure. Operations executed in a trustzone graphic rendering method illustrated in FIG. 10 may correspond to operations performed in the display device 400 or 500 according to an embodiment of the disclosure described with reference to FIGS. 1 through 9B. Thus, when a trustzone graphic rendering method 1000 illustrated in FIG. 10 is described, a description redundant to that made with reference to FIGS. 1 through 9A will not be provided.

To describe the trustzone graphic rendering method 1000, the display device 400 illustrated in FIG. 4 and the controller 610 illustrated in FIG. 6 will be referred to.

Referring to FIG. 10, the trustzone graphic rendering method 1000 may be a trustzone graphic rendering method in an OS divided into an NWD and an SWD corresponding to a trustzone.

The trustzone graphic rendering method 1000 may include operation S1010 of generating an image resource used to generate a trustzone UI in the NWD 620. Operation S1010 may be performed by at least one processor included in the controller 610. Operation S1010 may correspond to operation S711 of FIG. 7.

The image resource generated in operation S1010 is transmitted from the NWD 620 to the SWD 650 in operation S1020. Operation S1020 may be performed by at least one processor included in the controller 610. Operation S1020 may correspond to operation S713 of FIG. 7.

In the SWD 650, an image resource including a plurality of objects is separated and edited in units of objects to generate a trustzone UI in operation S1030. Operation S1030 may be performed by at least one processor included in the controller 610. Operation S1030 may correspond to operations S714 and S715 of FIG. 7.

In an embodiment of the disclosure, the template corresponding to the trustzone UI is transmitted as an image resource from the NWD to the SWD, and object-based separation and editing are performed using the image resource received in the SWD, thus generating the trustzone UI. Thus, each time when the trustzone UI is changed, an object to be changed is edited without a need to perform rendering for complete new image generation, thereby reducing a time and a memory capacity consumed in maintenance and repair of the trustzone UI. Accordingly, the intended trustzone UI may be generated rapidly and conveniently.

Some embodiments of the disclosure may be implemented with a recording medium including a computer-executable instruction such as a computer-executable programming module. A computer-readable recording medium may be an available medium that is accessible by a computer, and includes, for example, and without limitation, all of a volatile medium, a non-volatile medium, a separated medium, and a non-separated medium. The computer-readable recording medium may also include both a computer storage medium and a communication medium. The computer storage medium includes, for example, and without limitation, all of a volatile medium, a non-volatile medium, a separated medium, and a non-separated medium, which is implemented by a method or technique for storing information such as a computer-readable instruction, a data structure, a programming module, or other data. The communication medium includes a computer-readable instruction, a data structure, a programming module, or other data of a modulated data signal like carriers, or other transmission mechanisms, and includes an information delivery medium. Some embodiments of the disclosure may be implemented by a computer program including a computer-executable instruction such as a computer program executed by a computer, or a computer program product.

The particular example embodiments described in the disclosure are illustrative examples and are not intended to otherwise limit the scope of the disclosure in any way. For the sake of brevity, conventional electronics, control systems, software development and other functional aspects of the systems may not be described in detail.

It should be understood that the various example embodiments of the disclosure described herein should be considered in a descriptive sense only and not for purposes of limitation. Descriptions of features or aspects within each embodiment of the disclosure should typically be considered as available for other similar features or aspects in other embodiments of the disclosure.

While various example embodiments of the disclosure have been described with reference to the figures, it will be understood by those of ordinary skill in the art that various changes in form and details may be made therein without departing from the spirit and scope as defined, for example, by the following claims.

What is claimed is:

1. A trustzone graphic rendering method in an operating system (OS) divided into a normal world (NWD) and a secure world (SWD), the SWD corresponding to a trustzone, the trustzone graphic rendering method comprising:
generating an image resource comprising a plurality of objects used to generate a trustzone user interface (UI) in the NWD;
transmitting the image resource from the NWD to the SWD; and
generating the trustzone UI by separating the image resource and editing at least one of the plurality of objects to be changed in the SWD without rendering, in the SWD, one or more of the plurality of objects that are not changed, wherein the separating and editing is performed in units of objects.

2. The trustzone graphic rendering method of claim 1, wherein the generating of the image resource comprises generating the image resource in the NWD using at least one graphic toolkit present in the NWD.

3. The trustzone graphic rendering method of claim 1, wherein the trustzone UI comprises at least one of: a UI screen, image data corresponding to the UI screen, and/or an image resource used to generate the UI screen, wherein data is input and/or output through the UI screen based on an interaction with a user.

4. The trustzone graphic rendering method of claim 3, wherein the trustzone UI comprises at least one of: a secure keypad and a secure keyboard.

5. The trustzone graphic rendering method of claim 1, wherein the image resource comprises image data corresponding to at least a portion of an image output through a screen.

6. The trustzone graphic rendering method of claim 1, further comprising storing the image resource in a memory of the SWD upon receiving the image resource in the SWD, the memory of the SWD not being accessible by the NWD or from outside the OS.

7. The trustzone graphic rendering method of claim 6, wherein the generating of the trustzone UI comprises:
loading the image resource stored in the memory of the SWD; and
generating the trustzone UI by separating at least one object to be edited from among the plurality of objects included in the loaded image resource and editing the at least one separated object.

8. The trustzone graphic rendering method of claim 7, wherein the generating of the trustzone UI comprises generating the trustzone UI by performing at least one operation of: deleting at least one separated object, changing the at least one separated object, and/or adding at least one object to the at least one separated object.

9. The trustzone graphic rendering method of claim 1, wherein the generating of the image resource comprises generating the image resource corresponding to a language using a font engine executed in the NWD.

10. The trustzone graphic rendering method of claim 1, further comprising:
storing the trustzone UI in a frame buffer included in the SWD; and
displaying the trustzone UI loaded from the frame buffer.

11. The trustzone graphic rendering method of claim 1, wherein the trustzone UI is accessed and stored in the SWD.

12. A display device comprising:
a display;
a memory configured to store one or more instructions; and
a controller comprising at least one processor configured to execute the one or more instructions to execute an operating system (OS), the OS being divided into a normal world (NWD) and a secure world (SWD) corresponding to a trustzone,
wherein the at least one processor is further configured to:
generate an image resource comprising a plurality of objects used to generate a trustzone user interface (UI) in the NWD;
transmit the image resource from the NWD to the SWD; and,
generate the trustzone UI by separating the image resource and editing at least one of the plurality of objects to be changed in the SWD without rendering, in the SWD, one or more of the plurality of objects that are not changed, wherein the separating and editing is performed in units of objects.

13. The display device of claim 12, wherein the at least one processor is further configured to generate the image resource in the NWD using at least one graphic toolkit present in the NWD.

14. The display device of claim 12, wherein the trustzone UI comprises at least one of: a UI screen, image data corresponding to the UI screen, and/or an image resource used to generate the UI screen, wherein the display device is configured to input and/or output data through the UI screen based on interaction with a user.

15. The display device of claim 12, wherein the at least one processor is further configured to store the image resource in a memory of the SWD upon receiving the image resource in the SWD, the memory of the SWD not being accessible by the NWD or from outside the OS.

16. The display device of claim 12, wherein the at least one processor is further configured to load the image resource stored in the memory of the SWD and generate the trustzone UI by separating at least one object to be edited from among the plurality of objects included in the loaded image resource and editing the at least one separated object.

17. The display device of claim 16, wherein the at least one processor is further configured to generate the trustzone UI by deleting and/or changing the at least one separated object and/or adding at least one object to the at least one separated object.

18. The display device of claim 12, wherein the at least one processor is further configured to store the trustzone UI in a frame buffer included in the SWD and to display the trustzone UI loaded from the frame buffer on the display.

19. The display device of claim 12, wherein the at least one processor is further configured to generate the image resource corresponding to a language using a font engine executed in the NWD.

20. The display device of claim 12, wherein the trustzone UI comprises at least one of: a secure keypad and a secure keyboard.

* * * * *